March 11, 1969     C. G. GILES ET AL     3,431,996
VEHICLE GUIDANCE SYSTEM

United States Patent Office 3,431,996
Patented Mar. 11, 1969

3,431,996
VEHICLE GUIDANCE SYSTEM
Cyril George Giles, James Alexander Martin, and John Richard Spindlow, Harmondsworth, West Drayton, England, assignors to National Research Development Corporation, London, England, a British company
Filed Sept. 20, 1965, Ser. No. 488,523
Claims priority, application Great Britain, Sept. 23, 1964, 38,827/64
U.S. Cl. 180—98
Int. Cl. B60k 27/00; G05b 11/01
2 Claims

ABSTRACT OF THE DISCLOSURE

A system for automatically guiding a vehicle along a desired path by means of guidance equipment on the vehicle operating with reference to a linear field source extending parallel but offset with relation to the desired path.

---

This invention relates to the guidance of moving vehicles by the establishment along a prescribed path of a detectable field varying in value laterally and the provision on the vehicles of field-sensing means from which a signal, generally an electrical signal is obtained which varies according to the lateral departure of the vehicle from the prescribed path.

If the path is defined by a single field having its axis along the line of the path the sensing means usually comprises two sensors laterally spaced with reference to the direction of movement of the vehicle in order to obtain a combined signal the magnitude of which corresponds to the magnitude of departure and the sign or sense of which corresponds to the sense of the departure.

The field needs some physical means for its production such as an electric cable traversed by an alternating current if a magnetic field is used and, to hold it in place and protect it, it must usually be buried along the path i.e. along the centre line of the track on which the vehicle moves.

Cases arise in which it may not be convenient or even possible to bury a physical means such as a cable along the centre of the track.

To deal with such cases the invention contemplates employing a linear field source extending along one edge of the desired path and in accordance with the invention there is provided a vehicle guidance system comprising a linear field source extending along one edge of a desired path to be followed by a vehicle, field sensing means mounted on a vehicle and arranged to provide an electrical error signal indicative of the extent and sense of departure of an axis of such sensing means from a predetermined relationship with the direction of the adjacent section of said linear field source as the vehicle moves along said path and means for utilizing said electrical signal to enable guidance of said vehicle along said desired path.

Figure 1:
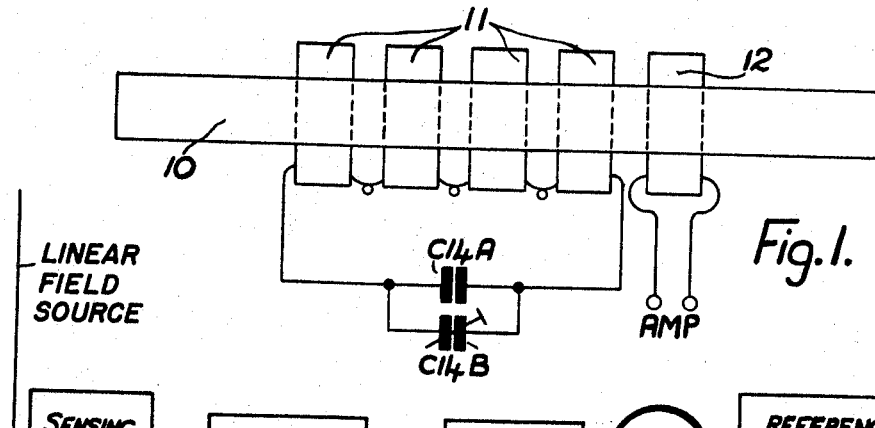
Figure 2:
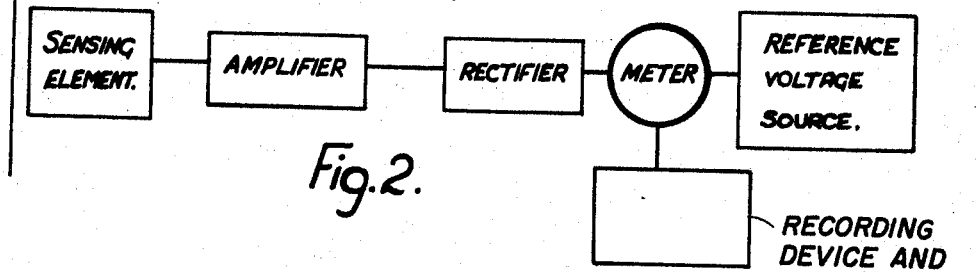
Figure 4:
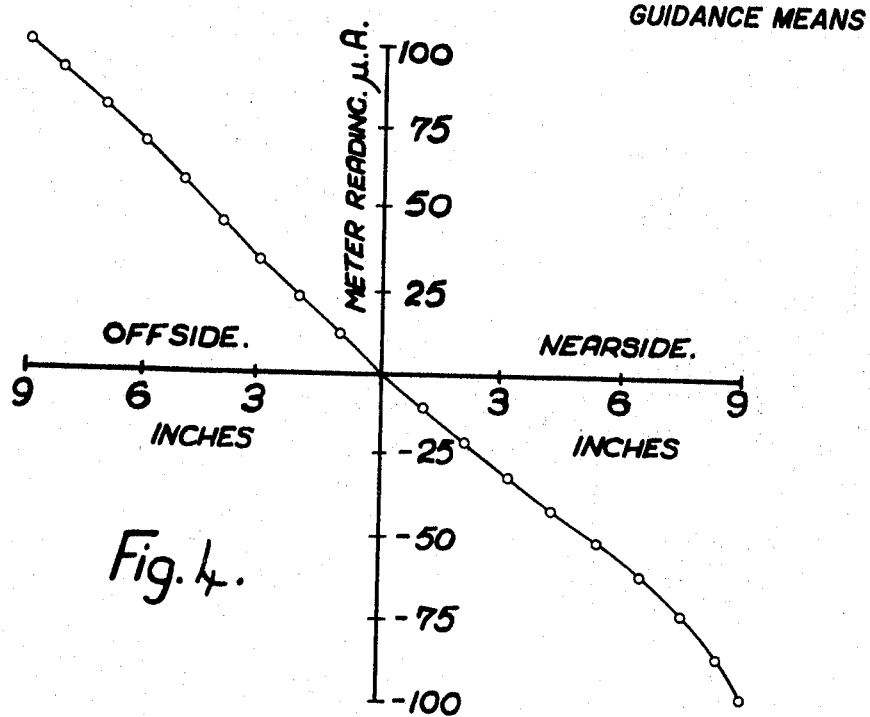
Figure 3A:
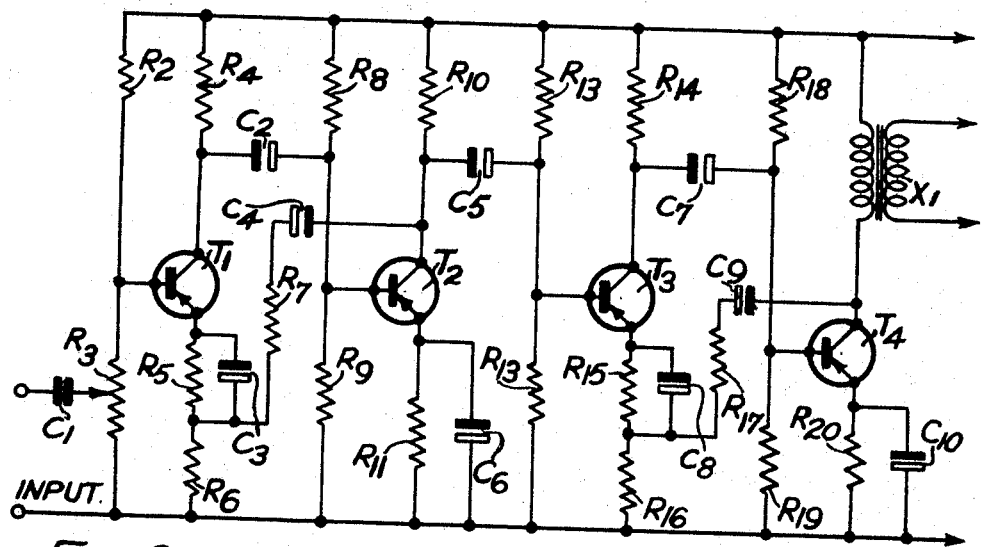
Figure 3B:
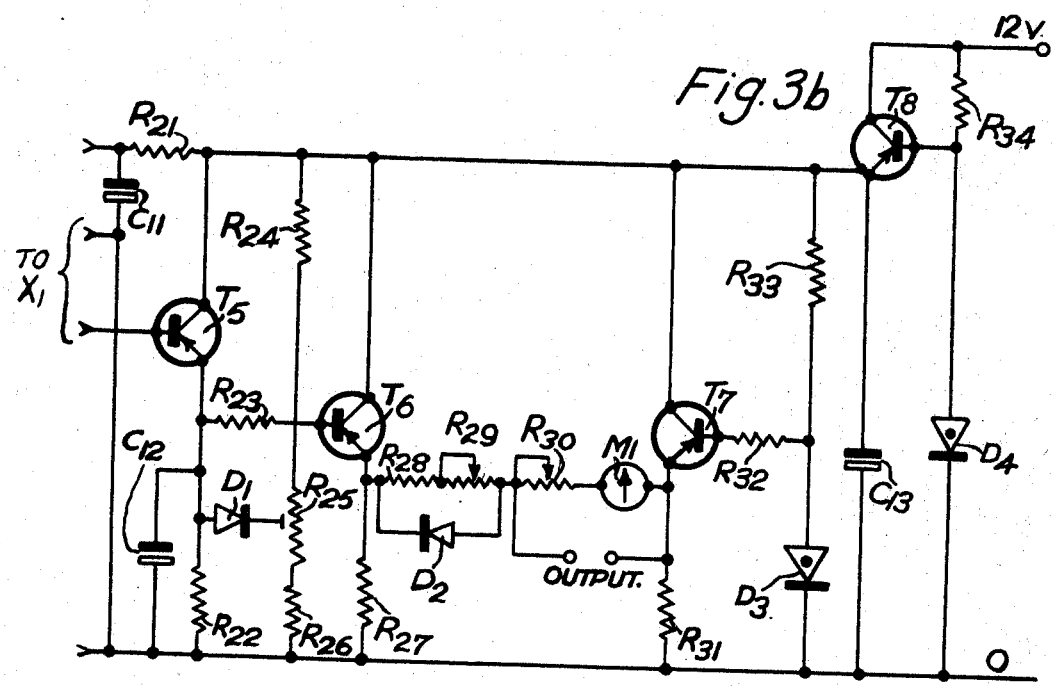

The various features and advantages of the invention will be apparent from the following description of an exemplary embodiment taken in conjunction with the accompanying drawings in which:

FIGURE 1 illustrates diagrammatically a sensing element used in the system of the invention, FIGURE 2 is a block schematic diagram of the sensing arrangement carried by a vehicle of the system, FIGURES 3(a) and 3(b) taken together show a circuit diagram of the arrangement of FIGURE 2, and FIGURE 4 is a graph of meter reading against deviation from course of a vehicle of the system.

Referring to FIGURE 1 the sensing element there shown comprises a ferrite rod 10 having wound on it a sensing coil 11 and a coupling coil 12. Coil 11 is composed of four wavewound sections each comprising 1100 turns of 9/47 litz wire and coil 12 is composed of one such section, the two coils being adjacently positioned along the length of the rod 10. A variable capacitance, in the form of a fixed capacitor 14A and a variable capacitor, 14B is connected across coil 11 to provide a circuit which can be tuned to resonate at the frequency of a signal which is applied by a signal generator to the wire or cable which constitutes the linear field source with which the sensing element is to co-operate. Coil 12 serves to couple the signal picked up by coil 11 from the field of the linear field source into an amplifier.

With the sensing element mounted on a vehicle with the longitudinal axis of the ferrite rod at right angles to an adjacent section of the linear field source and extending in a horizontal plane, the strength of the signal picked up by coil 11, for a given field strength of the linear field source will depend upon the distance between the sensing element and the wire or cable constituting the linear field source. Thus if the distance of the vehicle from the wire decreases or increases so the strength of the picked up signal will decrease or increase. The proportional change in signal strength for a given change in lateral displacement of the vehicle from the wire is more important to successful operation of the system than the absolute magnitude of such signal and it has been found that this proportional change varies in dependence upon the angular relationship between the longitudinal axis of the ferrite rod and the horizontal plane. In any given set of circumstances therefore it may be necessary to ascertain by simple experiment what attitude of the sensing element produces the greatest proportional change in signal for a given change in lateral displacement of the sensing element from the wire or cable. When it has been ascertained what relationship produces the best results, the sensing element can then be mounted fixedly on the vehicle with such experimentally determined relationship between the axis of its ferrite rod and the direction of the adjacent section of the wire constituting the field source.

Referring now to FIGURE 2 the whole sensing arrangement mounted on the vehicle is shown schematically in block form. It comprises the sensing element of FIGURE 1 with the coil 12 connected to the input of an amplifier which feeds a rectifier-and-smoothing arrangement connected to a meter of centre-zero type. Also connected to the meter is a reference voltage source and the voltages from the rectifier arrangement and the reference source are applied in opposition to the meter. The magnitude of the reference voltage is adjusted so that with the vehicle carrying the sensing arrangement moving along the prescribed path at the correct distance from the edge of such path and thus from the linear field source constituted by the wire, the two voltages applied to the meter are equal and the resulting null output from the sensing arrangement is indicated by the meter needle being positioned at the centre zero of the meter scale. This output is also connected to a recording device and guidance means which may serve, for example to control the steering of the vehicle in a sense to correct any deviations from prescribed course. If the vehicle deviates from prescribed course the magnitude of the signal from the rectifier arrangement will increase or decrease in accordance with the sense of such deviation and the needle of the meter will indicate the magnitude and sense of the change in such signal. The output to the recording device will change in the same way and can readily be applied to produce steering correction by conventional means.

FIGURE 4 illustrates the meter readings in microamps obtained when the arrangement is set to give full scale deflection in response to deviation of nine inches to either side of the prescribed course utilizing the sensing element of FIGURE 1 and the sensing arrangement shown schematically in FIGURE 2 and in full circuit detail in FIGURE 3.

Referring to FIGURES 3(a) and 3(b), the input to the circuit is the signal from the sensing element of FIGURE 1 and this is applied to two amplifier stages each constituted by a pair of transistors T1, T2 and T3, T4 connected in cascade. The output of the second amplifier stage is coupled by a transformer X1 to a transistor T5 arranged to act as a half wave rectifier which is in turn connected to an emitter follower transistor T6. The reference voltage source is constituted by a transistor T8 and two Zener diodes D3 and D4 the former of which is connected to the base of a second emitter follower transistor T7. Between the two emitter followers is connected the meter M1 in series with a compensating network constituted by the resistors R28 and R29 and a diode D2. The resistors are effectively in circuit when diode D2 is reverse biased and short circuited when diode D2 conducts.

In the detail circuit diagram of FIGURE 3, the components have the following values:

| | |
|---|---|
| $R_2R_{12}$ | 56K |
| $R_3R_9R_{13}R_{17}R_{19}R_{22}$ | 10K |
| $R_4R_{14}$ | 3.9K |
| $R_5R_{16}$ ohms | 470 |
| $R_6$ do | 150 |
| $R_7R_8R_{18}$ | 22K |
| $R_{10}$ | 1.5K |
| $R_{11}R_{34}$ | 1.2K |
| $R_{15}R_{20}R_{33}$ | 1K |
| $R_{21}$ ohms | 220 |
| $R_{23}R_{32}$ | 47K |
| $R_{24}R_{27}R_{31}$ | 5.6K |
| $R_{25}R_{29}R_{30}$ | 5K |
| $R_{26}$ | 68K |
| $R_{28}$ | 4.7K |
| $C_1C_2C_5C_7$ μf | 8 |
| $C_3C_6C_8C_9C_{10}$ μf | 100 |
| $C_4$ μf | 50 |
| $C_{11}C_{13}$ μf | 500 |
| $C_{12}$ μf | 1 |

The transistors and diodes are of the following types:

| | |
|---|---|
| $T_1T_2T_3T_4$ | OC71 |
| $T_5T_6T_7$ | OC201 |
| $T_8$ | OC72 |
| $D_1$ | CV448 |
| $D_2$ | OA5 |
| $D_3$ | OAZ208 |
| $D_4$ | OAZ210 | and the meter M1 of 100-0-100 μa. FSD type. The transformer X1 is a 3.6:1 transformer.

Each amplifier pair (i.e. T1, T2 and T3, T4) gives a voltage gain of 20.

The variable input control, R3, is set so that when the vehicle is in the desired position the voltage across R27 is the same as that across R31 and the meter reads zero.

The power to the whole sensing arrangement is derived from an electrical storage battery carried by the vehicle and is stabilised against variations in the supply to such battery from a generator also carried by the vehicle. The indicating meter M1 gives a deflection of ±1 μa. for a change in battery supply from 10 to 16 volts.

What we claim is:

1. A vehicle guidance system comprising a linear field source extending at one side of a desired path to be followed by a vehicle, field sensing means adapted to be mounted on said vehicle to provide a displacement signal representative of the distance of the field sensing means from said linear field source, reference means for providing a reference signal, means for providing an error signal from the difference between the said displacement signal and the said reference signal, the said error signal having zero value when the said sensing means is laterally offset from the said field source and the said vehicle is following the said desired path, whereby the said error signal is indicative of the extent and sense of the said vehicle from the said desired path, and guidance means for utilizing the said error signal to guide the said vehicle along the said desired path, said sensing means comprising a sensing coil and a coupling coil wound on different parts of the length of a ferrite rod.

2. A vehicle guidance system comprising a linear field source extending at one side of a desired path to be followed by a vehicle, field sensing means adapted to be mounted on said vehicle to provide a displacement signal representative of the distance of the field sensing means from said linear field source, reference means for providing a reference signal, means for providing an error signal from the difference between the said displacement signal and the said reference signal, the said error signal having zero value when the said sensing means is laterally offset from the said field source and the said vehicle is following the said desired path, whereby the said error signal is indicative of the extent and sense of the said vehicle from the said desired path, and guidance means for utilizing the said error signal to guide the said vehicle along the said desired path, said sensing means comprising an inductive sensing element, an amplifier for amplifying signals induced in said element and means for rectifying and smoothing the amplified signals to produce said displacement signal in the form of a direct current, and said reference means comprising a source of variable unidirectional voltage.

References Cited

UNITED STATES PATENTS

| | | | |
|---|---|---|---|
| 3,033,305 | 5/1962 | Harned et al. | 180—79.1 |
| 3,235,024 | 2/1966 | Barrett | 180—79.1 |
| 3,258,082 | 6/1966 | Amos et al. | 180—79.1 |
| 2,540,150 | 2/1951 | Watts. | |
| 2,929,019 | 3/1960 | Bryan et al. | 318—31 X |
| 3,009,525 | 11/1961 | DeLiban | 180—79.1 X |
| 3,247,740 | 4/1966 | Shuster | 180—77 |
| 3,249,175 | 5/1966 | Baxter | 180—108 |

KENNETH H. BETTS, *Primary Examiner.*

U.S. Cl. X.R.

318—18